(12) United States Patent
    Eichenlaub et al.

(10) Patent No.: US 10,476,616 B2
(45) Date of Patent: Nov. 12, 2019

(54) METHOD FOR CHECKING THE RADIO CHARACTERISTICS OF A MEANS OF TRANSPORT

(71) Applicant: P3 Aero Systems GmbH, Aachen (DE)

(72) Inventors: Justin Eichenlaub, Aachen (DE); Marcus Hammes, Aachen (DE); Bernd Knobe, Bonn (DE); Markus Michelt, Lünen (DE)

(73) Assignee: P3 Aero Systems GMBH, Aachen (DE)

( * ) Notice: Subject to any disclaimer, the term of this patent is extended or adjusted under 35 U.S.C. 154(b) by 0 days.

(21) Appl. No.: 16/043,555

(22) Filed: Jul. 24, 2018

(65) Prior Publication Data

US 2019/0036628 A1    Jan. 31, 2019

(30) Foreign Application Priority Data

Jul. 25, 2017 (DE) .......................... 10 2017 116 785

(51) Int. Cl.
   *H04B 17/318* (2015.01)
   *H04B 17/309* (2015.01)
   *H04L 29/08* (2006.01)
   *H04W 84/12* (2009.01)

(52) U.S. Cl.
   CPC ......... *H04B 17/318* (2015.01); *H04B 17/309* (2015.01); *H04L 67/12* (2013.01); *H04W 84/12* (2013.01)

(58) Field of Classification Search
   CPC ..... H04B 17/318; H04B 17/309; H04L 67/12; H04W 84/12
   See application file for complete search history.

(56) References Cited

U.S. PATENT DOCUMENTS 7,496,361 B1    2/2009  Mitchell
8,359,026 B2 *  1/2013  de La Chapelle .......................... H04B 7/18506
                                                                  455/422.1

(Continued)

FOREIGN PATENT DOCUMENTS

DE        29809772 U1   10/1998
DE    102007062081 A1    6/2009

OTHER PUBLICATIONS

English translation of Office Action issued in related patent application No. 102017116785.4 issued by the German Patent Office dated Mar. 13, 2018.

(Continued)

*Primary Examiner* — Brandon J Miller
(74) *Attorney, Agent, or Firm* — Woodard, Emhardt, Henry, Reeves & Wagner, LLP

(57) ABSTRACT

The subject of the disclosure is a method for testing the radio communication characteristics of a means of transport, said method having the steps:
   shaping a portable casing, which is configured from an electrically conductive material, in such a manner that the shape of the casing models a shape of the means of transport,
   arranging an item of fixtures and fittings within the casing,
   transmitting a radio signal at a first location within the casing, and
   receiving the radio signal, which is influenced by the item of fixtures and fitting, at a second location that is remote form the first location within the casing.

19 Claims, 3 Drawing Sheets

(56) References Cited

U.S. PATENT DOCUMENTS

Figure 1:
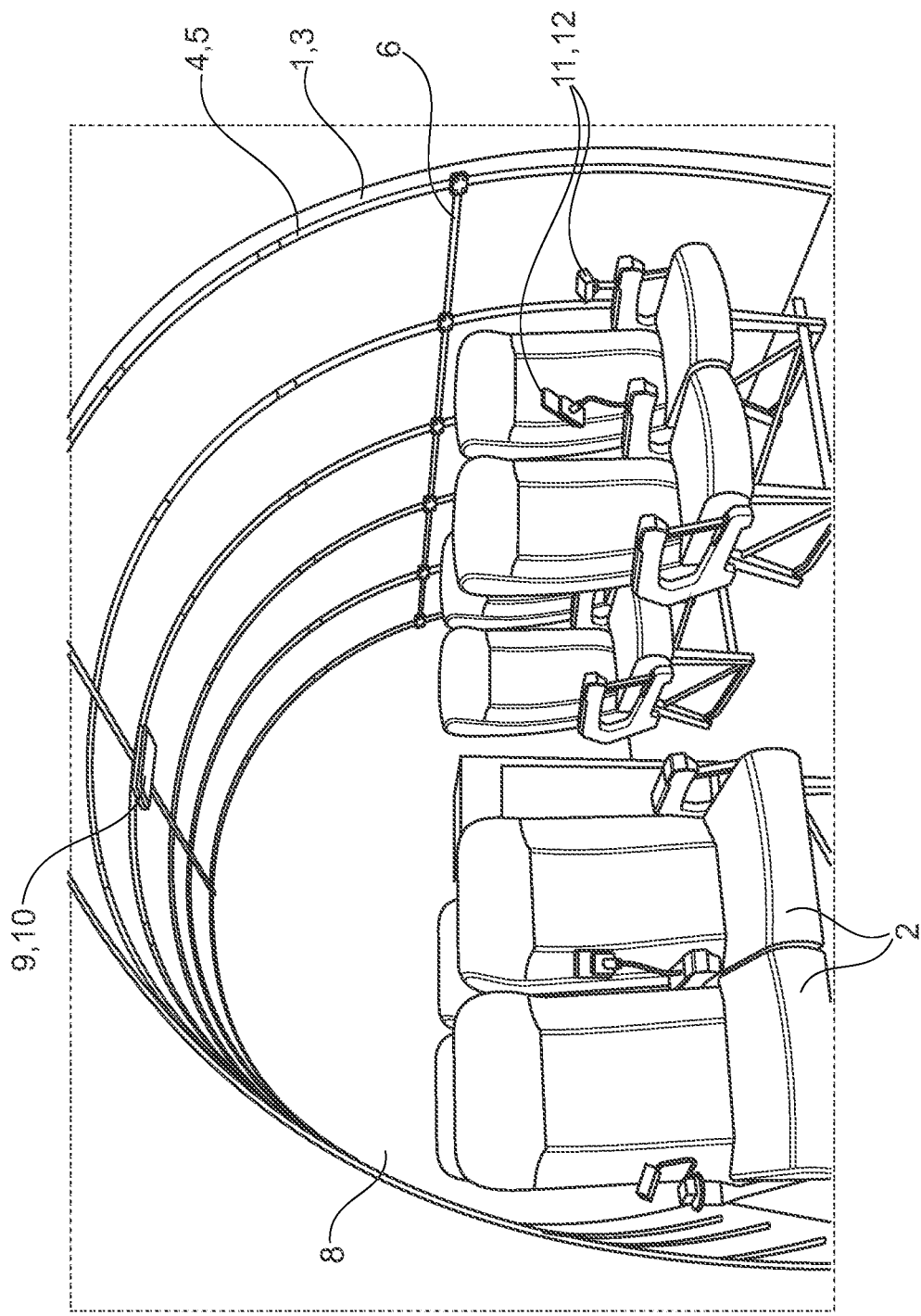

| | | | | |
|---|---|---|---|---|
| 8,477,692 B2* | 7/2013 | Ezaki | ................ | H04B 7/18506 |
| | | | | 370/328 |
| 2016/0060741 A1* | 3/2016 | Chevy | .................... | C22C 21/16 |
| | | | | 148/552 |
| 2016/0368585 A1* | 12/2016 | Farouz-Fouquet | ..... | B64C 1/064 |

OTHER PUBLICATIONS

Machine translation of DE102007062081A1 by Lexis Nexis Total Patent on Jul. 23, 2018.
Machine translation of DE29809772U1 by Lexis Nexis Total Patent on Jul. 23, 2018.

\* cited by examiner

METHOD FOR CHECKING THE RADIO CHARACTERISTICS OF A MEANS OF TRANSPORT

TECHNICAL FIELD

The invention relates to a method for testing the radio communication characteristics of a means of transport. In addition, the invention relates to use of a casing in order to test the radio communication characteristics of a means of transport.

BACKGROUND OF THE INVENTION

Quite recently means of transport and in particular aircraft have been increasingly provided with antennae that are arranged within the means of transport in order to render it possible for passengers to have fundamental or improved access to mobile radio networks and/or local radio networks. In order for the antennae that are arranged within an aircraft fuselage to be connected to the internet or telecommunication networks to enable radio communication, external communication connections to a satellite are created. The radio traffic within the aircraft relates not only to on-board entertainment, in which by way of example films are streamed from a server that is arranged in the aircraft to tablets held by the passengers, but rather said radio traffic increasingly also relates to sensors of the aircraft, by way of example an air-conditioning system, to sensors for detecting the position of seats, to sensors for detecting whether a trolley is secured prior to landing or to control elements such as light switches, air-conditioning controllers or stewardess calling systems. Studies have shown that the radio traffic within the aircraft will greatly increase in the future and will also relate to information that is relevant for the safety of the aircraft.

On account of the multiplicity of fixtures and fittings provided in an aircraft, such as rows of seats, luggage storage compartments, kitchens, toilets, partition walls etc., it is problematic to supply a passenger cabin with radio communication facilities. Quite frequently, seats located on the middle aisle have a good connection by way of example to a wireless-LAN-network provided in the aircraft, whereas in the case of the seats close to the window the connection is inadequate in order to create a stable connection with the wireless-LAN-network when using a laptop or Smart phone.

On account of high operating and production costs for aircraft, conventional methods for ensuring quality in radio networks in which speech and/or data connections are to be created to different targets where an end device repeatedly changes location are not financially viable nor can they be implemented in a practical reasonable manner regardless of whether it involves retrofitting an aircraft with a wireless-LAN-network or during the construction of an aircraft.

DESCRIPTION OF THE INVENTION

Based on this situation, it is an object of the present invention to provide a method and corresponding use in order to test and/or optimize the radio communication characteristics of a means of transport in a particularly cost-effective manner.

The object of the invention is achieved by means of the features of the independent claims. Advantageous embodiments are disclosed in the subordinate claims.

Accordingly, the object is achieved by means of a method for testing the radio communication characteristics of a means of transport, said method having the steps:

shaping a portable casing, which is configured from an electrically conductive material, in such a manner that the shape of the casing models a shape of the means of transport, arranging an item of fixtures and fittings within the casing, transmitting a radio signal at a first location within the casing, and receiving the radio signal, which is influenced by the item of fixtures and fittings, at a second location that is remote from the first location within the casing.

Moreover, the object is achieved by means of use of a portable shape-imparting casing, the shape of said casing being modelled on a shape of a means of transport and said casing being configured from an electrically conductive material, and use of an item of fixtures and fittings that is provided within the casing in order to receive at a second location that is remote from the first location within the casing a radio signal that is transmitted from a first location within the casing and is influenced by the item of fixtures and fittings in order to test the radio communication characteristics of the means of transport.

The invention consequently follows quite a new approach, in that the radio communication characteristics of the means of transport are not tested in the actual means of transport but rather a transportable measuring environment that may be used in various applications is proposed in order to map, simulate, test and/or to optimize the radio communication characteristics of the means of transport. Radio communication characteristics of means of transport, by way of example of aircraft, are influenced to a great extent by the fuselage, the geometry of the fuselage, fixtures and fittings that are provided in the fuselage or in a passenger cabin, and also the materials of the fuselage, of the passenger cabin and of the fixtures and fittings. Rather than recreate the fuselage in a rigid manner with a corresponding geometry, by way of example as a complex wooden model, or rather than testing the radio communication characteristics in an actual aircraft, which is encumbered with the associated necessary and consequently very costly stand times, the invention proposes a portable shape-imparting casing that is configured from an electrically conductive material wherein the shape of the casing models the shape of the aircraft to be tested.

It is possible in this manner to quickly create a testing environment as a laboratory without having to incur costs to precisely reproduce the means of transport. Since the shape or geometry of the casing and also the fixtures and fittings and consequently their materials may be changed at short notice, the invention provides an enormous time advantage to a user or developer of radio communication equipment of the means of transport. The invention offers quite considerable advantages precisely during the planning of radio communication equipment in an already existing fuselage or during the development of the fuselage which may be constructed as a prototype for performing preliminary measurements using the invention. In addition, it is possible to evaluate essential fixtures and fittings that are part of the fuselage equipment, such as by way of example seats, kitchens or toilets, with regard to the radio communication characteristics in a realistic environment, which likewise leads to comparatively favourable development costs.

The proposed casing renders it possible to map almost any typical shape of a means of transport and in particular any fuselage geometry relatively quickly. Moreover, the casing and/or the fixtures and fittings may be reused for subsequent measurements. By virtue of the fact that the measuring environment that is created in this manner may be used at different locations, it is not necessary, in contrast to the methods known in the prior art, by way of example to send a complete set of seats to the measuring site, which would be costly, but rather it is possible in a simple manner for the measuring environment to be brought to a development site of the means of transport and/or of the fixtures and fittings. Tests have shown that both initial costs and also setup costs for such a measuring environment amount to only a fraction of the costs involved when performing measurements using methods known in the prior art.

The procedure of shaping the casing may include constructing, erecting and/or expanding the casing in such a manner that the shape of the constructed, erected and/or expanded casing models the shape of the means of transport, be it in part or as a whole. It is possible in this respect, by way of example in the case of an aircraft as the means of transport, for the shape of the casing to model a fuselage section of an upper shell of an aircraft fuselage. The term 'model' preferably means copying in such a manner that an internal shape of the casing does not impart to an informed user any other entire impression than an internal shape of the means of transport. The term 'within the casing' is thus preferably understood to mean that the first location and the second location are arranged in a free internal space that is encompassed at least in part by the casing. Rather than shaping the casing, which is configured from the portable electrically conductive material, in such a manner that the shape of the casing models the shape of the means of transport, the shape of the casing may model the shape of the means of transport and/or the shape of the casing may be so well-developed that it is possible to model the radio communication characteristics that are demonstrated by the shape of the means of transport.

The first location is preferably remote from the second location, in particular at least 1, 2, 5, 10, 20 or 50 m away. It is further preferred that the radio signal is transmitted at a plurality of first locations and/or that the radio signal is received at a plurality of second locations, wherein in each case the first locations are remote from the second locations. It is still further preferred that said radio signals are transmitted at at least 2, 3, 5, 10, 20 or 50 first locations that are arranged in each case spaced apart with respect to one another. Said radio signals are likewise preferable received at at least 2, 3, 5, 10, 20, 50, 100, 150 or 200 locations. It is quite particularly preferred in the case of an aircraft that said radio signals are received at each aircraft seat.

According to a preferred further development, the first location, the second location, the material of the item of fixtures and fittings, the item of fixtures and fittings and/or a position of the item of fixtures and fittings within the casing are changed to the extent that a signal strength of the received radio signal is improved or a maximum signal strength is achieved within the casing. By varying the first location at which the radio signal is transmitted, and/or varying the second location or the position of the item of fixtures and fittings, it is possible to test whether the quality of the reception at the item of fixtures and fittings may be improved by virtue of a different arrangement by way of example of an antenna for transmitting the radio signal and/or the item of fixtures and fittings. Likewise, the material of the item of fixtures and fittings and/or the item of fixtures and fittings as such may be varied in order to test any influence on the signal strength of the received radio signal. It is preferred that the first location, the material of the item of fixtures and fittings, the item of fixtures and fittings and/or the position of the item of fixtures and fittings are selected in such a manner that it is possible in the case of a plurality of fixtures and fittings to achieve a highest possible signal strength of the received radio signals at the position of the item of fixtures and fittings.

In a preferred further development of the method or use, the casing corresponds to the peripheral surface of a part-circular cylinder and/or the shape of the casing has a semi-circular or part-circular cross section. In the case of an aircraft as the means of transport, the casing is preferably configured as a fuselage section of an upper fuselage shell and comprises in this manner a semi-circular cylinder with a corresponding semi-circular cross section. The peripheral surface preferably extends between longitudinal horizontal edges of the casing that are supported on the base and transverse edges of the casing that form a semi-circular or part-circular profile.

According to another preferred further development of the method or use, the casing comprises a shape-imparting portable frame, a framework and/or a support construction, the casing being placed on and/or stretched across said frame and/or said frame having a semi-circular cross section. The frame, the framework and/or the support construction is preferably configured as a type of tent and according to a preferred further development comprises a skeleton, a linkage and/or rods of wood, bamboo, synthetic material, glass fibre-reinforced synthetic material and/or metal. In addition or as an alternative thereto, the skeleton, the linkage and/or the rods may comprise horizontal and vertical components that are fixed to one another by means of a connecting piece. It is preferred that it is possible to attach the casing in a releasable manner at the longitudinal side edges and/or transverse side edges to the frame, the framework and/or the support construction. The vertical components extend preferably from a longitudinal side edge in a semi-circular or part-circular profile towards the other longitudinal side edge of the casing. It is preferred that the connecting piece is of a plate-shaped construction, wherein the horizontal and vertical components, by way of example horizontal and transverse rods, may be fixed to one another at a right angle by means of two plates. Likewise, it is possible to provide an inflatable element that is covered with foam and the casing is placed and/or is stretched on said inflatable element.

In one preferred further development of the method or use, one or two lateral end sides and/or a base side of the casing is/are configured from an electrically conductive material and/or is/are closed. When the casing has the shape of a semi-circular or part-circular cross section, the lateral end sides likewise have a semi-circular or part-circular cross-sectional area. The end sides of the casing may likewise form a point in order to create the shape of an aircraft nose, a cockpit and/or the rear of an aircraft. It is preferred that the casing, the two lateral transverse sides and the base side completely encompass the interior space of the casing with the electrically conductive material.

According to another preferred further development of the method or use, radio signals are transmitted by means of an antenna that is fastened to the casing and/or radio signals are received by means of a mobile telephone, a Smart phone, a lap top and/or a tablet. The antenna is preferably fastened within the casing to a ridge in the casing, by way of example to the frame, the framework and/or the support construction. The antenna may be designed as desired, by way of example as an omnidirectional antenna, a slot cable or as a combination of different antennae. It is likewise possible to provide a plurality of antennae by way of example at least 2, 3, 5, 10 or 10 antennae that are arranged spaced apart with respect to one another on the casing. The antennae may all be provided on the ridge, wherein a number of the antennae may be likewise arranged spaced with respect to the ridge. It is preferred that the test procedure includes repeatedly creating speech and/or data connections between the first location and the second location or between the antenna and the mobile telephone, the Smart phone, the laptop and/or the tablet. It is preferred that at least 5, 10, 20, 50, 100, 150 or 200 mobile telephones, the Smart phones, the laptops and/or the tablets are provided that are arranged in particular spaced apart with respect to one another. In the case of an aircraft, it is preferred that a mobile telephone, Smart phone, laptop and/or tablet is provided at each aircraft seat, at each second or at each third aircraft seat and/or in each row of seats.

Fundamentally different options are available for the design of the casing that may likewise be configured as a membrane. According to a particularly preferred further development of the method or use, the casing is configured as a canvas that is coated with a metal, in particular with silver and/or aluminium, or is configured as an aluminium sheet. It is particularly preferred that the casing is configured from a material that is marketed under the trade names Shieldex Bremen, Shieldex Nora Dell or Shieldex Zell and/or comprises a woven fabric of polyamide fibres that are coated with silver, a woven fabric comprising polyamide fibres that are coated with a mixture of nickel, copper and silver or a woven fabric comprising polyamide fibres that are coated with copper. It is preferred that the casing is dimensionally stable, bendable and/or flexible and may be configured by way of example in a bendable manner such that the casing retains its dimensionally stable shape after bending.

According to another preferred further development of the method or use, the radio signal includes a signal from a local radio network, a mobile radio signal and/or a short range signal. It is preferred that the signal from a local radio network includes a signal from a wireless local network, also referred to as Wireless-LAN, and/or according to an IEEE 802.11 standard. The mobile radio signal includes by way of example a GSM, UMTS or LTE standard. The short range signal includes by way of example a so-called Bluetooth signal according to an IEEE 802.15.1 standard.

According to a still further preferred further development of the method or use, the first location is provided above the item of fixtures and fittings and/or the second location is provided at the same height as the item of fixture and fittings. The term 'same height as the item of fixtures and fittings' is understood to mean a position in which a passenger of the means of transport typically holds the mobile telephone, the Smart phone, the laptop and/or the tablet when in use, preferably when the passenger has sat down in a means of transport that is configured as a seat.

In one preferred further development of the method or use, the means of transport is configured as an aircraft, bus, train, underground train, submarine or ship. Furthermore, other means of transport are conceivable, by way of example a mini-bus or a motor vehicle. The proposed method and use are suitable in an advantageous manner for testing the radio communication characteristics in the case of a means of transport that comprises an interior space for passengers, said interior space having walls that are configured from an electrically conductive material.

In one preferred further development of the method or use, the item of fixtures and fittings includes a seat, a row of seats, a luggage compartment, a wagon, a trolley, a suitcase, a control unit of the means of transport, a shelf, a table, a stairway, a toilet, a kitchen and/or a partition wall. Furthermore, it is preferred that the item of fixtures and fittings includes any piece of furniture or any fitting that may be provided in an aircraft, bus, train, underground train, submarine or ship. It is preferred that the item of fixtures and fittings is fastened to the casing and/or to the base and/or may be displaced and/or rolled across the base in order to test the radio communication characteristics of the means of transport.

SHORT DESCRIPTION OF THE DRAWINGS

The invention is further explained below with reference to the attached drawings with the aid of a preferred exemplary embodiment.

Figure 2:
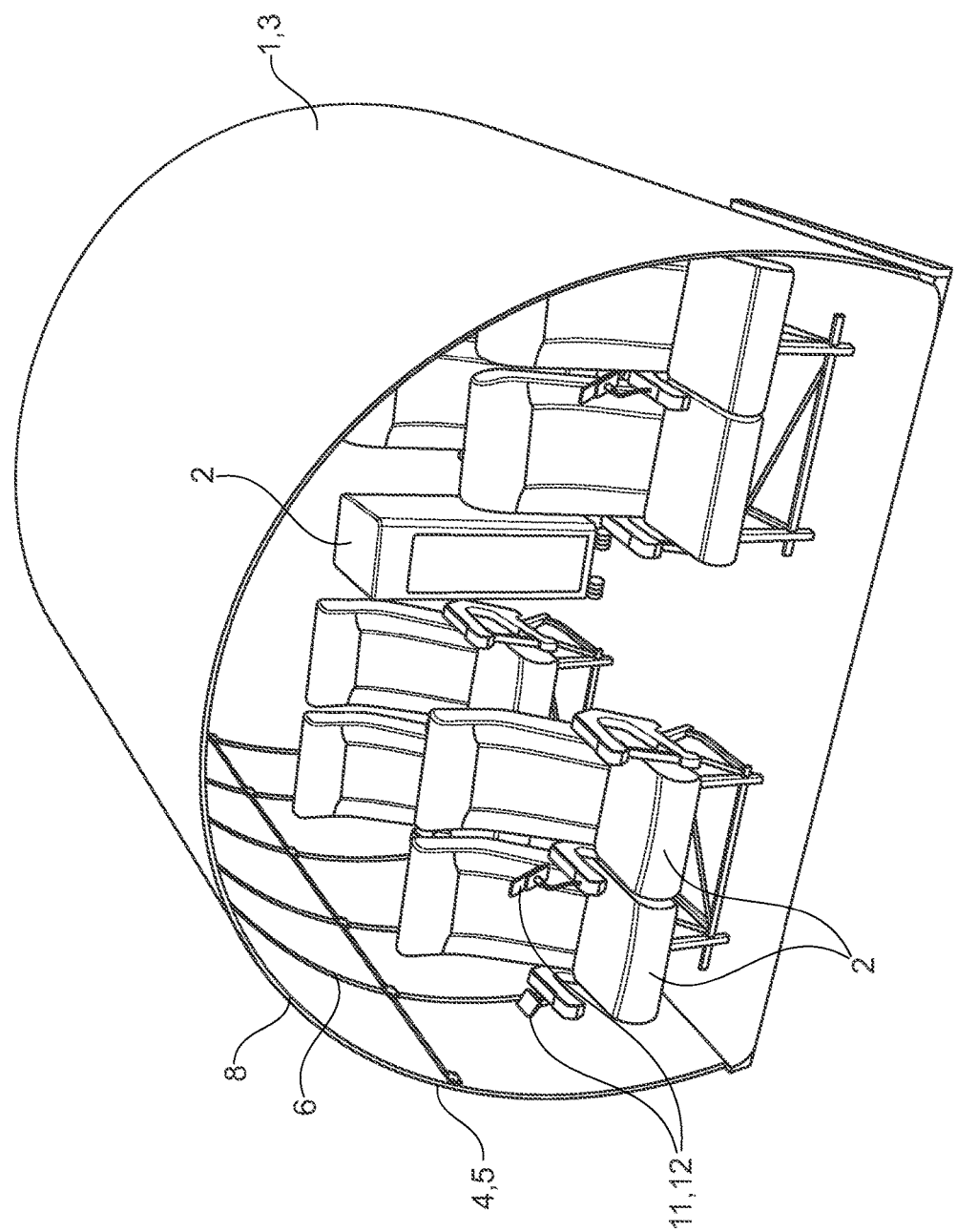
Figure 3:
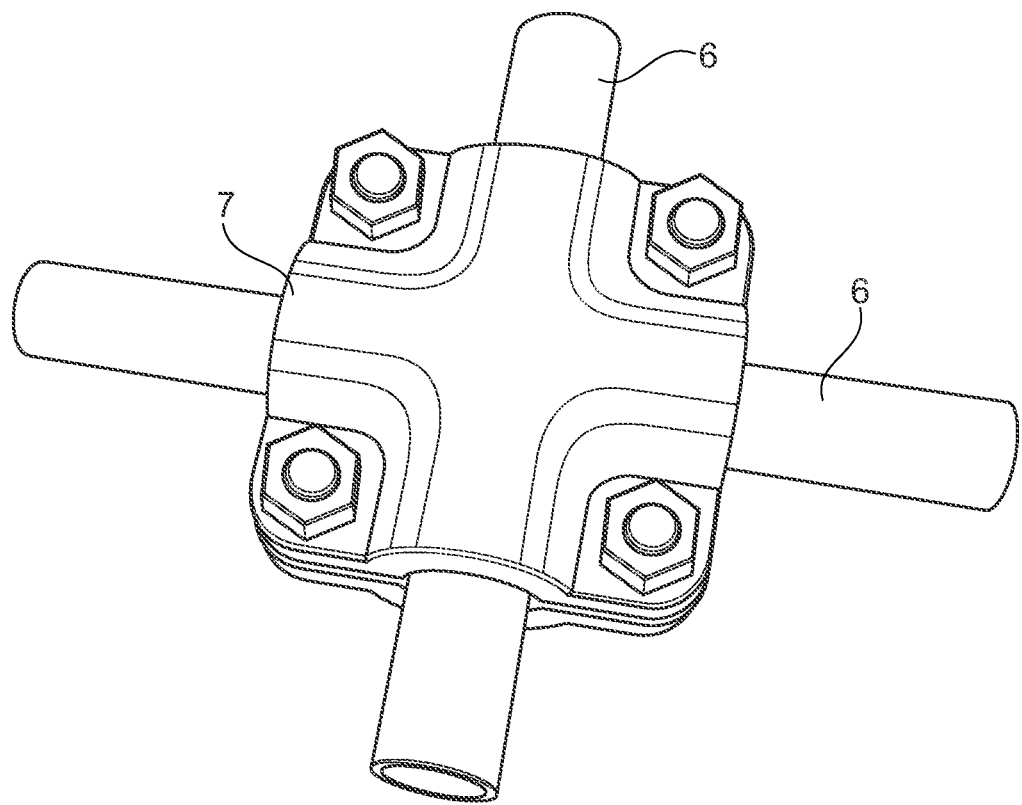

In the drawings:

FIG. 1 illustrates a schematic perspective view of a portable casing that is configured from an electrically conductive material with items of fixtures and fittings arranged in said casing in accordance with a preferred exemplary embodiment of the invention, FIG. 2 illustrates a further schematic perspective view of the portable casing that is configured from the electrically conductive material with items of fixtures and fittings arranged in said casing in accordance with FIG. 1, and FIG. 3 illustrates a schematic perspective view of a connecting piece for connecting horizontal and vertical components of the casing in accordance with a preferred exemplary embodiment of the invention.

DETAILED DESCRIPTION OF THE EXEMPLARY EMBODIMENTS

FIGS. 1 and 2 illustrate in a schematic perspective view a portable casing 1 that is configured from an electrically conductive material with a plurality of items 2 of fixtures and fittings arranged in said casing in accordance with a preferred exemplary embodiment of the invention.

The casing 1 represents a transportable measuring environment that may be used in various applications for testing the radio communication characteristics of the means of transport. The means of transport may be configured by way of example as an aircraft, bus, train, underground train, submarine or ship. For this purpose, the shape of the casing 1 is modelled or shaped on the shape of the means of transport. The casing 1 illustrated in FIGS. 1 and 2 has a shape that is modelled according to a segment of an upper fuselage half of an aircraft and has a semi-circular or part-circular cross section. Accordingly, the shape of the casing 1 corresponds to the peripheral surface 3 of a part-circular cylinder.

The casing 1 is configured as a type of a tent comprising a shape-imparting portable frame 4, a framework and/or a support construction that is configured from a skeleton, linkage and/or rods 5 of wood, bamboo, synthetic material, glass fibre-reinforced synthetic material and/or metal. The skeleton, linkage and/or rods 5 may be plugged together with the result that the casing 1 may be built up and assembled for simple transportation. The rods 5 comprise horizontal and vertical components 6 that support the casing 1 and are spaced apart in a regular arrangement. The vertical components 6 extend in a semi-circular manner from one longitudinal side of the casing 1 to the other longitudinal side of the casing 1 and are supported at their ends together with the respective longitudinal side of the casing 1 in an almost perpendicular direction from the base.

The horizontal components 6 extend in a purely horizontal manner and cross the vertical components 6 at a right angle. Connecting pieces 7, as illustrated in FIG. 3, are provided in order to fix the horizontal and vertical components 6 at a right angle with respect to one another. The connecting pieces 7 comprise two plates that surround the horizontal and vertical components 6 on both sides and are screwed to one another by means of bolts. In this case, horizontal components 6 that extend continuously between the transverse sides are provided on the inner face on the base on the two longitudinal sides of the casing 1, on the inner face of the two longitudinal sides at head height and also on the inner face on the ridge of the casing 1.

The casing 1 is configured as a canvas that is coated with a metal, in particular with silver and/or aluminium, in the form of an aluminium sheet. The base that is adjacent to the longitudinal sides of the casing 1 is likewise configured from an aluminium sheet. In addition, the two lateral end sides 8 on the transverse sides of the casing 1 are configured from aluminium sheet with the result that an interior space of the casing 1 is surrounded on all sides and completely shielded by means of the aluminium sheet. For illustration purposes, the front end side 8 is not closed in FIG. 1 and FIG. 2.

Different items 2 of fixtures and fittings are provided on the base in the interior space within the casing 1. As is apparent in the figures, two rows each having two aircraft seats are arranged on both sides of the aisle. In addition, a movable trolley is parked in the rear region in the aisle. Items 2 of fixtures and fittings may likewise be luggage compartments, suitcases, control units of the means of transport, a shelf, a table, a stairway, a toilet, a kitchen and/or a partition wall, all not illustrated.

An antenna 9 that transmits a radio signal is fastened to the horizontal component 6, which is arranged on the ridge of the casing 1, in the middle between the transverse sides of the casing 1 at a first location 10 above the item 2 of fixtures and fittings. The radio signal includes a signal of a local radio network, by way of example according to an IEEE 802.11 standard, a mobile radio signal, by way of example according to a GSM, UMTS or LTE standard, and/or a short range signal, by way of example according to an IEEE 802.15.1 standard.

Multiple mobile telephones 12 that are configured as Smart phones are fastened at a second location 11 at head height and/or hand height to the items 2 of fixtures and fittings, said mobile telephones being configured to receive the radio signals that are transmitted from the antenna 9 and are influenced and/or reflected by means of the items 2 of fixtures and fittings. In lieu of the mobile telephone 12, it is also possible to use laptops or tablets (not illustrated) that are likewise as the mobile telephones 12 fastened to the item 2 of fixtures and fittings at head and/or hand height.

It is possible by varying the first location 10 or the arrangement of the antenna 9 within the casing 1, the second location 11, a type of antenna 9 and/or a position of the items 2 of fixtures and fittings within the casing 1 to test whether it is possible to improve a signal strength of the received radio signal or to establish the position within the casing 1 at which the signal strength of the received radio signal is at a maximum. Likewise, it is possible by virtue of the variations mentioned above to test whether it is possible to achieve maximum signal strength of the received radio signal at all the seats.

The exemplary embodiments described are merely examples that may be modified and/or expanded in numerous ways within the scope of the claims. Each feature that has been described for a specific exemplary embodiment may be used as a stand-alone feature or in combination with other features in any arbitrary other exemplary embodiment. Each feature that has been described for one exemplary embodiment of a specific category may also be used in a corresponding manner in an exemplary embodiment of another category.

LIST OF REFERENCE NUMERALS

Casing 1
Item of fixtures and fittings 2
Peripheral surface 3
Frame 4
Rods 5
Horizontal and vertical components 6
Connecting pieces 7
End side 8
Antenna 9
First location 10
Second location 11
Mobile telephone 12

The invention claimed is:

1. Method for testing radio communication characteristics of a means of transport, said method comprising the steps:
shaping a portable casing, which is configured from an electrically conductive material, in such a manner that the shape of the casing models a shape of the means of transport and wherein the casing is configured as a canvas that is coated with a metal and/or is configured as an aluminium sheet,
arranging an item of fixtures and fittings within the casing,
transmitting a radio signal at a first location within the casing,
receiving the radio signal, which is influenced by the item of fixtures and fitting, at a second location that is remote form the first location within the casing, and
varying the first location, the second location, a material of the item of fixtures and fitting, the item of fixtures and fittings and/or a position of the item of fixtures and fittings within the casing to such an extent that a signal strength of the received radio signal is improved or a maximum signal strength is achieved within the casing.

2. Method according to claim 1, wherein the casing corresponds to the peripheral surface of a part-circular cylinder and/or the shape of the casing has a semi-circular or part-circular cross section.

3. Method according to claim 1, wherein the casing comprises a shape-imparting portable frame, a framework and/or a support construction, the casing being placed on and/or stretched across said frame and/or said frame having a semi-circular cross section.

4. Method according to claim 3, wherein the frame, the framework and/or the support construction comprises a skeleton, a linkage and/or rods of wood, bamboo, synthetic material, glass fibre-reinforced synthetic material and/or metal and/or the skeleton, the linkage and/or the rods comprise horizontal and vertical components that are fixed to one another by means of an connecting piece.

5. Method according to claim 1, wherein one or two lateral end sides and/or a base side of the casing is/are configured from an electrically conductive material and/or is/are closed.

6. Method according to claim 1, wherein the radio signal is transmitted by means of an antenna that is fastened to the casing and/or the radio signal is received by means of a mobile telephone, a Smart phone, a laptop and/or a tablet.

7. Method according to claim 1, wherein the casing is configured as a canvas that is coated with silver and/or aluminium.

8. Method according to claim 1, wherein the radio signal includes a signal from a local radio network, a mobile radio signal and/or a short range signal.

9. Method according to claim 1, wherein the first location is above the item of fixtures and fittings and/or the second location is at the height of the item of fixtures and fittings.

10. Method according to claim 1, wherein the means of transport is configured as an aircraft, bus, train, underground, submarine or ship.

11. Method according to claim 1, wherein the item of fixtures and fittings includes a seat, a row of seats, a luggage compartment, a wagon, a trolley, a suitcase, a control unit of the means of transport, a shelf, a table, a stairway, a toilet, a kitchen and/or a partition wall.

12. A method of using a portable shape-imparting casing, the shape of said casing being modelled on the shape of a means of transport and said casing being configured from an electrically conductive material, the method comprising:
   providing an item of fixtures and fittings within the casing,
   transmitting a radio signal from a first location within the casing,
   receiving the radio signal at a second location that is remote from the first location within the casing, wherein the radio signal is influenced by the item of fixtures and fittings,
   varying the first location, the second location, a material of the item of fixtures and fitting, the item of fixtures and fittings and/or a position of the item of fixtures and fittings within the casing to such an extent that a signal strength of the received radio signal is improved or a maximum signal strength is achieved within the casing
   testing the radio communication characteristics of the means of transport, and wherein the casing is configured as a canvas that is coated with a metal and/or is configured as an aluminium sheet.

13. The method according to claim 12, wherein the casing corresponds to the peripheral surface of a part-circular cylinder and/or the shape of the casing has a semi-circular or part-circular cross section.

14. The method according to claim 12, wherein the casing comprises a shape-imparting portable frame, a framework and/or a support construction, the casing being placed on and/or stretched across said frame and/or said frame having a semi-circular cross section.

15. The method according to claim 14, wherein the frame, the framework and/or the support construction comprises a skeleton, a linkage and/or rods of wood, bamboo, synthetic material, glass fibre-reinforced synthetic material and/or metal and/or the skeleton, the linkage and/or the rods comprise horizontal and vertical components that are fixed to one another by means of a connecting piece.

16. The method according to claim 12, wherein one or two lateral end sides and/or a base side of the casing is/are configured from an electrically conductive material and/or is/are closed.

17. The method according to claim 12, wherein the radio signal is transmitted by means of an antenna that is fastened to the casing and/or the radio signal is received by means of a mobile telephone, a Smart phone, a laptop and/or a tablet.

18. The method according to claim 12, wherein the radio signal includes a signal from a local radio network, a mobile radio signal and/or a short range signal.

19. The method according to claim 12, wherein the first location is above the item of fixtures and fittings and/or the second location is at the height of the item of fixtures and fittings.

* * * * *